United States Patent
Heinsohn et al.

(10) Patent No.: US 9,284,127 B2
(45) Date of Patent: Mar. 15, 2016

(54) CONVEYORS HAVING A ROTATABLE TRANSFER SECTION

(71) Applicant: DÜRR SYSTEMS GMBH, Bietigheim-Bissingen (DE)

(72) Inventors: Klaus Heinsohn, Weil der Stadt (DE); Lutz Philipp, Vaihingen/Enz (DE)

(73) Assignee: DÜRR SYSTEMS GMBH, Bietigheim-Bissingen (DE)

( * ) Notice: Subject to any disclaimer, the term of this patent is extended or adjusted under 35 U.S.C. 154(b) by 38 days.

(21) Appl. No.: 14/140,958

(22) Filed: Dec. 26, 2013

(65) Prior Publication Data

US 2014/0102857 A1    Apr. 17, 2014

Related U.S. Application Data

(63) Continuation-in-part of application No. PCT/EP2012/062079, filed on Jun. 22, 2012.

(30) Foreign Application Priority Data

Jul. 5, 2011    (DE) .......................... 10 2011 078 707

(51) Int. Cl.
*B62D 65/18* (2006.01)
*B65G 37/00* (2006.01)
*B65G 37/02* (2006.01)
(Continued)

(52) U.S. Cl.
CPC ................ *B65G 37/00* (2013.01); *B62D 65/18* (2013.01); *B65G 37/02* (2013.01); *B65G 47/80* (2013.01); *F26B 15/14* (2013.01); *F26B 2210/12* (2013.01)

(58) Field of Classification Search
CPC ...... B62D 65/18; B65G 47/80; F26B 2210/12
See application file for complete search history.

(56) References Cited

U.S. PATENT DOCUMENTS 2,986,261 A * 5/1961 Wenstrand ............. B65G 47/80
                                                198/457.05
3,871,303 A * 3/1975 Woodling ................. B61B 1/02
                                                104/168

(Continued)

FOREIGN PATENT DOCUMENTS

DE    3714616    12/1988
DE    4329384    3/1995

(Continued)

OTHER PUBLICATIONS

Patent Cooperation Treaty, "International Preliminary Report on Patentability," issued by the International Searching Authority in connection with PCT Application No. PCT/EP2012/062079, mailed Jan. 16, 2014 (6 pages).

(Continued)

*Primary Examiner* — Gene Crawford
*Assistant Examiner* — Thomas Randazzo
(74) *Attorney, Agent, or Firm* — Hanley, Flight & Zimmerman, LLC

(57) ABSTRACT

Apparatus and systems related to conveyors having a rotatable section are disclosed. Another example apparatus includes first and second conveyors transporting objects in order, and a rotatable transfer section to which the objects are provided from the first conveyor in a first direction. The objects are to be rotated about an axis of rotation and placed onto the second conveyor from the rotatable transfer section in a second direction different from the first direction.

23 Claims, 7 Drawing Sheets

(51) Int. Cl.
  *B65G 47/80* (2006.01)
  *F26B 15/14* (2006.01)

(56) References Cited

U.S. PATENT DOCUMENTS

| | | | | | |
|---|---|---|---|---|---|
| 3,906,596 | A | * | 9/1975 | Fleissner | D06C 3/00 26/92 |
| 3,934,515 | A | * | 1/1976 | Cushman | B66B 21/10 104/18 |
| 4,108,088 | A | * | 8/1978 | Burden, Jr. | F23G 5/20 110/246 |
| 4,197,934 | A | * | 4/1980 | Matsui | B61B 13/04 104/287 |
| 4,761,894 | A | * | 8/1988 | Hamasaki | F26B 3/305 118/58 |
| 5,411,130 | A | * | 5/1995 | Noestheden | B23Q 7/1468 198/457.07 |
| 5,556,466 | A | * | 9/1996 | Martin | F26B 15/14 118/65 |
| 5,577,593 | A | * | 11/1996 | Hooper | B62D 65/18 104/165 |
| 6,471,039 | B1 | * | 10/2002 | Bruun | B65G 37/02 198/577 |
| 6,722,494 | B2 | * | 4/2004 | Nakakado | A61F 13/15764 198/377.01 |
| 7,600,329 | B2 | * | 10/2009 | Ortlieb | B60S 3/002 34/270 |
| 8,056,200 | B2 | * | 11/2011 | Hesse | B23K 37/02 198/346.1 |
| 8,850,712 | B2 | * | 10/2014 | Laviolette | F26B 5/042 118/634 |
| 2001/0030108 | A1 | * | 10/2001 | Hansen | B62D 65/18 198/728 |
| 2004/0052621 | A1 | * | 3/2004 | Beerhalter | B61D 47/005 414/331.13 |
| 2004/0251112 | A1 | * | 12/2004 | Freudelsperger | B65G 35/06 198/415 |
| 2006/0096835 | A1 | * | 5/2006 | Bellezza | B62D 65/18 198/345.3 |
| 2006/0131133 | A1 | * | 6/2006 | Weber | B65G 29/00 198/457.01 |
| 2006/0283687 | A1 | * | 12/2006 | Heinemeier | B62D 65/18 198/345.3 |
| 2009/0067962 | A1 | * | 3/2009 | Lee | B62D 65/18 414/331.11 |
| 2009/0208318 | A1 | * | 8/2009 | Camelli | B65G 47/80 414/749.6 |
| 2011/0132572 | A1 | * | 6/2011 | Sato | F26B 15/04 165/61 |

FOREIGN PATENT DOCUMENTS

| | | |
|---|---|---|
| DE | 19505622 | 8/1996 |
| DE | 20001533 | 9/2000 |
| DE | 19950202 | 5/2001 |
| DE | 10319613 | 11/2004 |
| DE | 202005001780 | 6/2006 |
| DE | 102009021004 | 10/2010 |
| DE | 102011078707 | 1/2013 |
| EP | 0641984 | 3/1995 |
| EP | 1473258 | 11/2004 |
| WO | 03/043915 | 5/2003 |
| WO | 2009/046885 | 4/2009 |
| WO | 2013/004520 | 1/2013 |

OTHER PUBLICATIONS

Patent Cooperation Treaty, "International Search Report," issued by the International Searching Authority in connection with PCT application No. PCT/EP2012/062079, mailed Sep. 12, 2012 (7 pages).

Patent Cooperation Treaty, "Written Opinion of the International Searching Authority," issued by the International Searching Authority in connection with PCT/EP2012/062079, mailed Sep. 12, 2012 (6 pages).

German Patent Office, "Search Report," issued in connection with German Patent Application No. 10 2011 078 707.0, on Nov. 25, 2011 (5 pages).

* cited by examiner

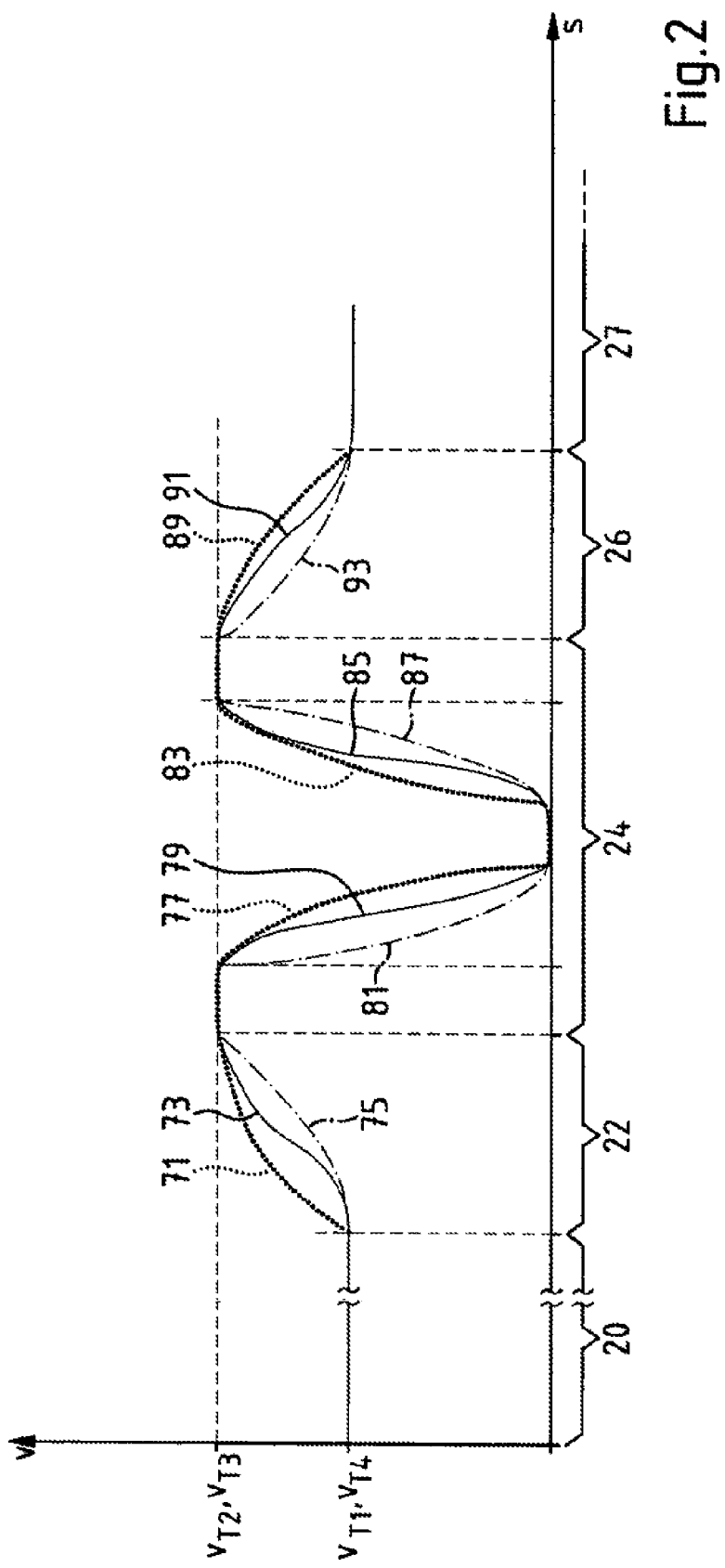

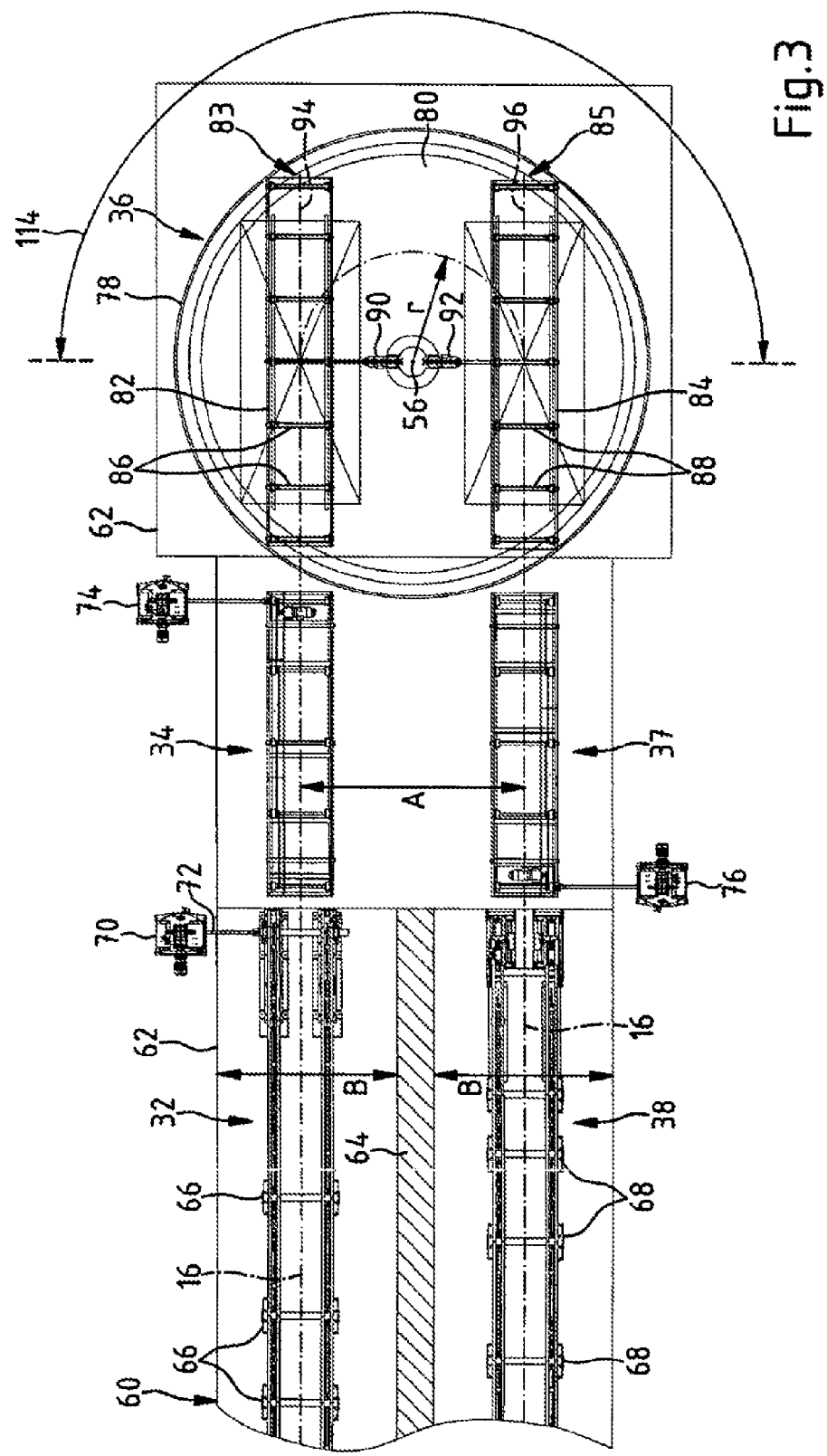

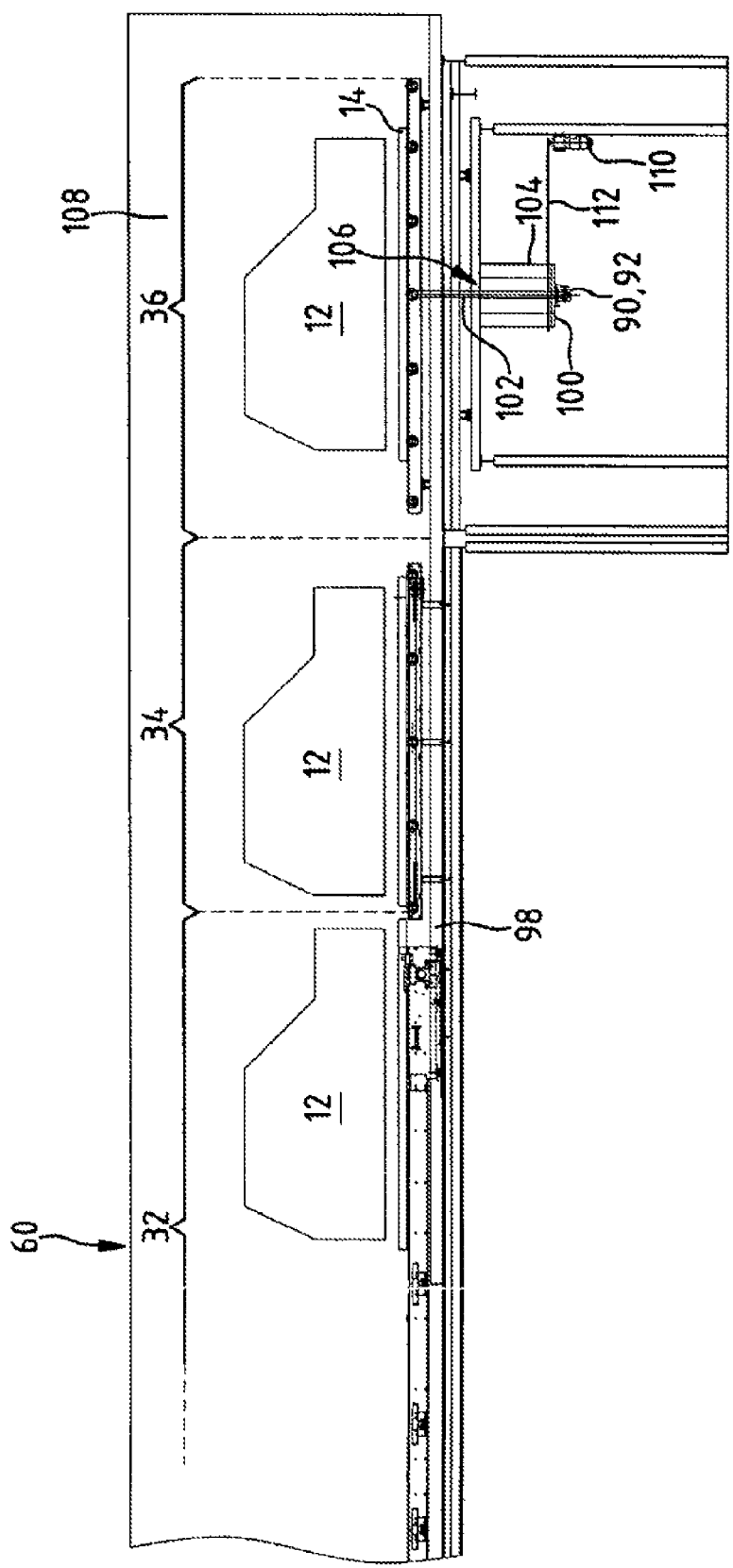

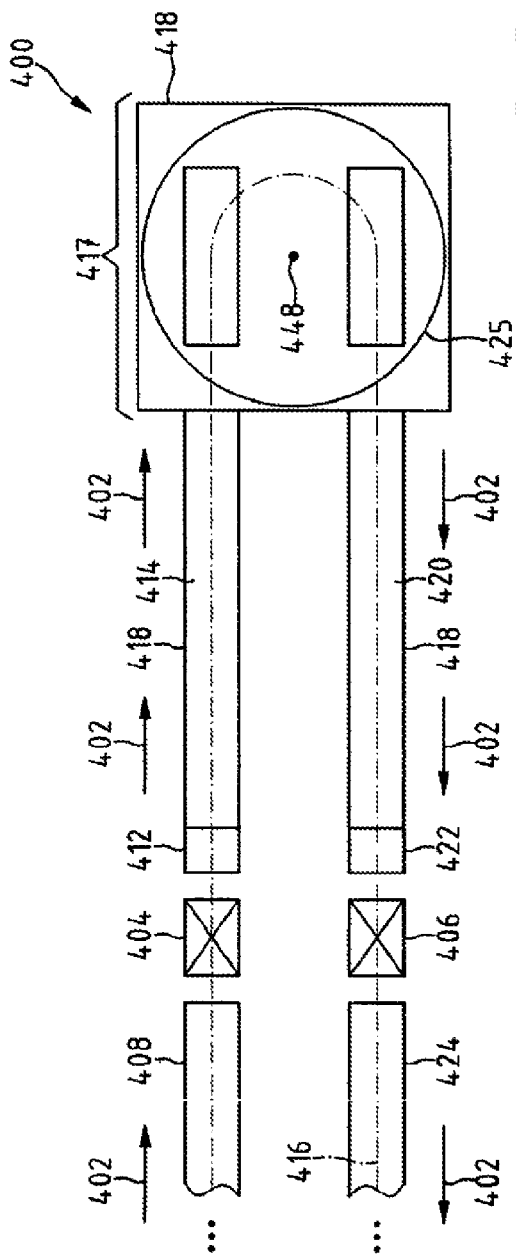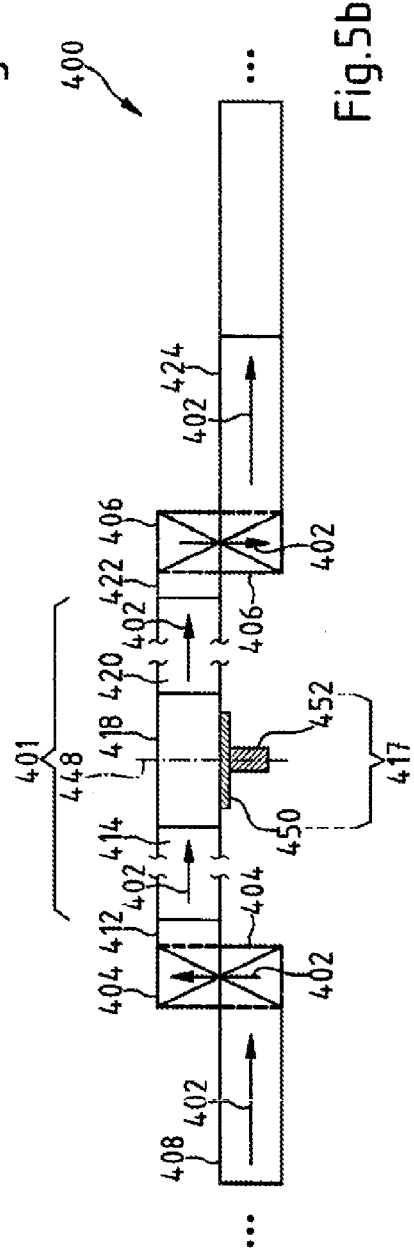

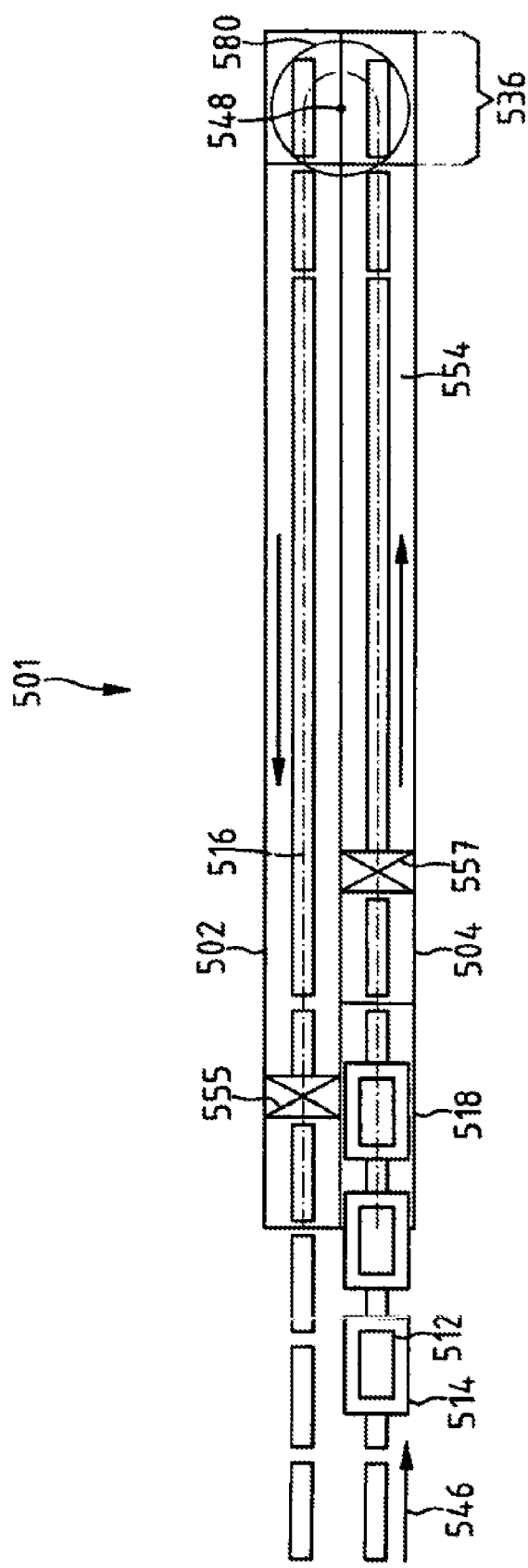

US 9,284,127 B2

CONVEYORS HAVING A ROTATABLE TRANSFER SECTION

RELATED APPLICATION

This patent arises from a continuation-in-part of International Patent Application No. PCT/EP2012/062079, which was filed on Jun. 22, 2012, which claims priority to German Patent Application No. 10 2011 078 707, which was filed on Jul. 5, 2011. The foregoing International Patent Application and German Patent Application are hereby incorporated herein by reference in their entireties.

FIELD OF THE DISCLOSURE

This disclosure relates generally to conveyors, and, more particularly, to conveyors having a rotatable transfer section.

BACKGROUND

Conveyors are commonly used in industrial production facilities (e.g., coating, cleaning facilities, etc.) to move workpiece carriers carrying production objects (e.g., articles, baskets, frames, or frameworks) via transport slides (e.g., skids), on which the production objects are received, through a facility. The workpiece carriers are moved on a multiplicity of rolls, some of which are driven.

Some conveyors are described in German Patent DE 199 50 202 A1 or European Patent EP 0 641 984 B1. These conveyors are used in industrial production facilities (e.g., coating and/or cleaning facilities).

BRIEF DESCRIPTION OF THE DRAWINGS

FIG. 2 is a graph depicting different speed curves corresponding to movement of motor vehicle bodies on a conveyor through the example coating facility of FIG. 1.

FIG. 3 is a detailed plan view of the conveyor of the example coating facility of FIG. 1.

FIG. 4 is a detailed side view of the conveyor of the example coating facility of FIGS. 1 and 3.

FIG. 5a is a plan view of an example facility for drying motor vehicle bodies with a conveyor in a hot-gas atmosphere region.

FIG. 5b illustrates a portion of a longitudinal section of the example facility for drying motor vehicle bodies of FIG. 5a.

FIG. 6 illustrates an example drying section in a coating facility.

Figure 1:
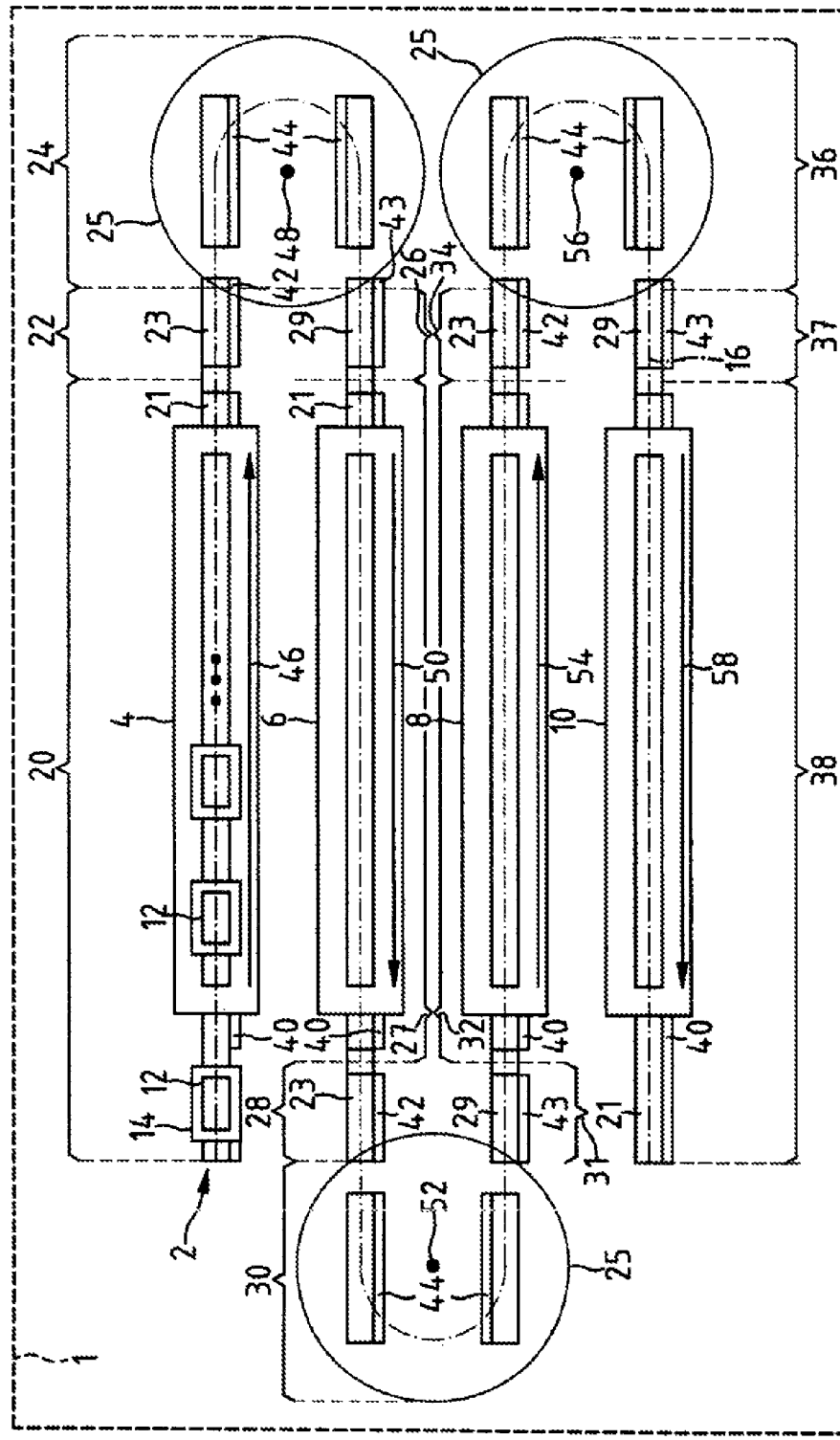
FIG. 1 is a plan view of an example coating facility for transporting motor vehicle bodies in accordance with the teachings of this disclosure.

The figures are not to scale. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

The examples disclosed herein relate to conveyors to transport objects (e.g., articles, goods, workpieces, motor vehicle bodies, etc.) arranged in a particular order. The conveyors have a conveyor segment on which the objects may be moved by a fixed drive system and the direction of movement of the conveyor may change. Some examples additionally relate to a facility for treating the surface of workpieces (e.g., drying workpieces including motor vehicle bodies, etc.) by conveyors described herein.

The example conveyors described herein have a conveyor segment which contains at least one transfer section, to which the objects are supplied in a first direction of movement, in which the objects are rotated about a fixed axis of rotation, and from which the objects are removed in a second direction of movement different from the first direction of movement.

FIG. 1 is a plan view of an example coating facility 1 comprising a hot-gas atmosphere region for drying and a conveyor for transporting motor vehicle bodies in accordance with the teachings of this disclosure. The coating facility 1 is for treating the surface of workpieces which, in this example, are motor vehicle bodies 12. The coating facility 1 has treatment sections 4, 6, 8, 10 and a conveyor 2 to move the motor vehicle bodies 12, in which each motor vehicle body 12 is placed on a skid 14 (e.g., transport slide for workpieces). At the treatment sections 4, 6, the motor vehicle bodies 12 are coated with paint applied by painting robots. At the treatment sections 8, 10, the motor vehicle bodies 12 are transported through a hot-gas atmosphere to dry the paint. In some examples, parts of ships, aircraft and/or rail vehicles are transported and treated. In other examples, parts of exhaust gas cleaning arrangements or wind energy conversion facilities are transported and treated. In some examples, a facility may handle relatively large products (e.g., greater than 3 meters (m)).

In the example of FIG. 1, the conveyor 2 has a conveyor segment 16 to move the motor vehicle bodies 12 on the skids 14 along the conveyor segment 16 through the coating facility 1. The conveyor segment 16 has a path of travel substantially resembling the letter W, but may be arranged in any suitable manner.

The conveyor segment 16 has a plurality of conveyor sections 20, 22, 24, 26, 27, 28, 30, 31, 32, 34, 36, 37, 38 positioned in order. The conveyor segment 16 contains a first conveyor section 20, which is a transport section to move the skids 14 at a substantially constant first transport speed, $v_{T1}$.

In one example, in second conveyor sections 22, 28, 34, the skids 14 carrying the motor vehicle bodies 12 are accelerated from a first transport speed, $v_{T1}$, to a second speed, $v_{T2}$, wherein preferably $v_{T2}$ is greater than $v_{T1}$. The second conveyor sections 22, 28, 34 are, therefore, acceleration sections. Additionally, the conveyor segment 16 comprises third conveyor sections 24, 30 and 36, which are transfer sections to rotate about an axis of rotation 48, 52, 56. In this example, in fourth conveyor sections 26, 31, 37, the skids 14 are decelerated from a third transport speed, $v_{T3}$, to a fourth speed, $v_{T4}$, where preferably $v_{T4}$ is less than $v_{T3}$, and the fourth speed, $v_{T4}$, is preferably greater than or equal to the first transport speed, $v_{T1}$. The fourth conveyor sections 26, 31, 37 are braking (e.g., deceleration) sections. A fifth conveyor section 27 adjoins the fourth conveyor section 26 and is a transport section, in which the skids 14 move at a substantially constant fourth transport speed, $v_{T4}$.

The conveyor segment 16 has additional conveyor sections 32, 38, which are transport sections, in which the skids 14 are moved at a substantially constant average speed.

In this example, each of the conveyor sections 20, 22, 24, 26, 27, 28, 30, 31, 32, 34, 36, 37, 38 have a skid conveyor arrangement 21, 23, 25, 29 with a drive system 40, 42, 43, 44. The skid drive system 40 in the first conveyor sections 20, 27, 32, 38 is configured as a two-line conveyor arrangement. In one example, in the second conveyor sections 22, 28, 34, the skid conveyor arrangement 23 preferably has a skid drive system 42, 43 with fixed bearing and driving rolls over which the skid 14 may roll. The skid conveyor arrangements 23 act as discharge roll conveyors, in which the skid 14 is accelerated and may be decelerated by fixedly mounted and driven rolls on the skid conveyor arrangements 23. In another example, at least one skid conveyor arrangement 23 is a substantially shorter chain conveyor.

In the conveyor sections 24, 30, 36, a skid conveyor arrangement 25 is arranged and contains a rotary device with a skid drive system 44. The skid drive system 44 has a skid conveyor arrangement 25 comprising two linear movement arrangements positioned substantially parallel and at a distance from one another. The two linear movement arrangements are assembled onto a rotary table. The distance between the linear movement arrangements is substantially equal to twice the curve radius of the conveyor segment in the region of the transfer section 24.

In the conveyor section 20, the skids 14 arranged thereon are transported at the first speed, $v_{T1}$, and move from the conveyor section 20 to the conveyor section 22. The skid 14 moving at the first speed, $v_{T1}$, into the conveyor section 22 is accelerated by the discharge roll conveyor 23 in the second conveyor section 22 to the second speed, $v_{T2}$. The discharge roll conveyor 23 in the conveyor section 22 supplies objects to the conveyor section 24. The skid 14 moves at the second speed, $v_{T2}$, from the second conveyor section 22 into the conveyor section 24. In the conveyor section 24, the skid 14 is decelerated by the skid drive system 44 of the skid conveyor arrangement 25 from the speed, $v_{T2}$, to rest. Also, in the conveyor section 24, the skid 14 is rotated on a rotary table about an axis of rotation 48. After rotating the rotary table approximately 180°, the skid 14 is accelerated by the skid drive system 44 to the speed, $v_{T3}$, and displaced from the conveyor section 24 to the fourth conveyor section 26 in a second direction of movement 50 different from the first direction of movement 46. In the fourth conveyor section 26, the skid 14 carrying a motor vehicle body 12 is decelerated by the skid drive system 43 of the skid conveyor arrangement 29 from the third speed, $v_{T3}$, to the fourth speed, $v_{T4}$. In this example, the skid conveyor arrangement has fixedly mounted rolls provided with at least one braking arrangement. In this example, the skid conveyor arrangement 29 acts as a handover unit, which hands over and decelerates the skids 14 from the conveyor section 24. The conveyor section 26 hands over the skid 14 at the speed, $v_{T4}$, to the next conveyor section 27. In one example, after the skid 14 passes the conveyor section 27, the above-described procedure is repeated in a preferred exemplary embodiment as often as desired, and the procedure mechanisms (i.e., method steps) are repeated.

In the example described in connection with FIG. 1, the skid 14 is moved from the conveyor section 27 to the conveyor section 28 by a discharge roll conveyor 23, which accelerates the skid 14 in a manner substantially similar to the conveyor section 22 and moves the skid 14 into the conveyor section 30. Similar to the conveyor section 24, the skid 14 is transferred in the region of the conveyor section by the rotary table. The skid 14 is rotated again by the rotary table about a second vertical axis of rotation 52 approximately 180° (i.e., displaced in a substantially circular path). The direction of rotation of the rotary table in the conveyor section 30 is substantially opposite to the direction of rotation of the third conveyor section 24. In the conveyor section 30, the direction of movement 50 of the skid 14 is altered to a third direction of movement 54. In this example, the third direction of movement 54 is substantially parallel to the first direction of movement 46 and, thus, oriented in substantially the same direction.

The skid 14 passes the conveyor section 30, via an additional second conveyor section 31, onto an additional conveyor section 32, in which the skid 14 is transitioned over in the direction of movement 54 from the skid conveyor arrangement 25. The skid conveyor arrangement 25 is configured as an accelerating discharge unit 23 into the conveyor section 34, in which the skid 14 is accelerated again and moved to the last conveyor section 36 by rotation of a rotary table of the skid conveyor arrangement 25 about an axis of rotation 56 approximately 180° from the third direction of movement 54 into a fourth direction substantially opposite of movement 58. In one example, the skid 14 moves from the conveyor section 36 into the conveyor section 37, which preferably operates as a braking discharge unit, from which the skid 14 is moved into the last conveyor section 38.

FIG. 2 is a graph depicting different speed curves corresponding to the movement of motor vehicle bodies through the example coating facility 1 of FIG. 1 on a conveyor. The speed of the motor vehicle bodies is plotted relative to displacement through the conveyor sections. The motor vehicle bodies 12 move through the conveyor section 20 at a substantially constant speed, $v_{T1}$. In one example, in the adjoining acceleration section 22, the motor vehicle bodies 12 are preferably accelerated in accordance with one of speed curves 71, 73, 75 at a constant or changing acceleration from the speed, $v_{T1}$, to the speed, $v_{T2}$, and moved into the transfer section 24. In this first acceleration section, as well as subsequent acceleration and/or braking sections, acceleration profiles running parabolically or hyperbolically may be provided in accordance with the examples described or any other appropriate acceleration profile. In one example, in the transfer section, the motor vehicle bodies 12 are preferably decelerated with speed curves 77, 79, 81 and later accelerated to a speed, $v_{T3}$, via one of the speed curves 83, 85, 87 after the rotary table has been rotated. In one example, the motor vehicle bodies 12 are then moved to the braking section 29 and decelerated with constant or changing deceleration, preferably, with one of the speed curves 89, 91, 93, such that the motor vehicle bodies 12 are moved at a substantially constant speed, $v_{T4}$, within the conveyor section 27.

In some examples, the use of rotary tables in the transfer section areas allows use of a conveyor segment 16 have a path shaped substantially resembling the letter W, which allows space conservation of the coating facility 1. The negotiation of curves by skids and products is, thus, avoided and the skids 14 moving the products arranged thereon may be moved at a relatively short spacing between the skids 14 throughout the coating facility 1. The minimum distance to be maintained between the two skids 14 in the conveyor 2 is determined substantially by the conveying capacity of the third conveyor sections 24, 30 and 36, which is advantageously different from conveyors with continuously running chain conveyors, in which the direction of movement of skids is changed during negotiation of curves. In this example, the minimum spacing between two successive skids is dependent specifically on the radius of the curves and must, therefore, be greater when a smaller curve radius is present. The acceleration and deceleration of the skids 14 through the conveyor sections 22, 24, 26, 28, 30, 31 and additionally 34, 36, 37 substantially ensures that the skids 14 may be transported through the conveyor sections 20, 27, 32 38 continuously with substantially short spacing between the skids 14.

The conveyor sections 32 to 38 will be described in greater detail in connection with FIG. 3. Basic principles of construction described may be applicable, however, to the other conveyor sections 20 to 31 and vice-versa. FIG. 3 shows a section of the coating facility 1 with conveyor sections 32, 34, 36, 37 and 38 arranged in a dryer tunnel 60 with a hot-gas atmosphere having a temperature, T, generally ranging from 60° C. to 250° C.

The dryer tunnel 60 has a thermally insulating outer wall 62 and separates the conveyor section 32 from the conveyor section 38, via an inner wall 64 that may be composed of or partially composed of thermal insulation material. The drive rolls 66, 68 in the conveyor sections 32, 38 are each coupled to a drive system positioned outside the dryer tunnel 60. The conveyor direction of the motor vehicle bodies 12 is substantially opposite between the two conveyor sections 32 and 38.

FIG. 3 is a detailed plan view of the conveyor of the example coating facility of FIG. 1. In this example, an electric motor 70 drives the drive rolls 66 in the conveyor section 32 and is equipped with a drive shaft 72 protruding through the wall 62 of the dryer tunnel 60 and transmitting forces onto an endless chain via a gearwheel. Therefore, the electric motor 70 does not have to withstand a hot-gas atmosphere. The conveyor sections 34 and 37 have electric motors 74, 76 located outside the thermally insulated outer wall 62 of the dryer tunnel.

The conveyor section 36 contains a rotary device 78, which has a rotary table 80, two linear movement arrangements 83, 85 mounted on the rotary table and includes respective drive units for the rotary table and the linear movement arrangements. The rotary table 80 is rotatable about a fixed vertical axis of rotation 56, wherein the linear movement arrangements are positioned parallel to one another and on the rotary table, in each example, at a distance from the axis of rotation. The positioning of the linear movement arrangements corresponds to paths of displacement 94, 96 for the skids, of which the paths are positioned in a spatially offset manner.

In this example, the rotary table 80 is a hot-region rotary table and is received on a supporting construction made of steel (e.g., St 37, etc.). The rotary table 80 may, in particular, have a plate made of stainless steel sheet, which may be fitted onto a structure made of structural steel. The rotary table may, however, also be produced from aluminum and/or other metals, and, in on example, preferably has at least one layer of thermally insulating non-metal material on the underside. To move the skids 14 carrying motor vehicle bodies 12, the rotary device 78 contains two linear movement arrangements 83, 85 with roll conveyors 82, 84, respectively. The roll conveyors 82, 84 are hot-region conveyors and have transport rolls 86, 88, which comprise of, at least in portions, for example, temperature-resistant plastic and/or metal. In this example, the linear movement arrangements 83, 85 each comprise a roll conveyor, a transmission and an electric drive 90, 92. The transmission couples the electric drives 90, 92 to the transport rolls 86, 88 of the roll conveyors 82, 84, respectively.

A motor vehicle body 12 on the skid 14 may be moved by the electric drives 90, 92 on the rotary device 78 through a circular arc 79 having a radius, r=A/2. A denotes the distance of the conveyor segment 16 in the conveyor section 32 from the conveyor segment 16 in the conveyor section 38, as shown in connection with FIG. 3. The radius, r, may, for example, be slightly less than 2.90 m and allow a width, B, of more than 4.0 m of the conveyor sections 32, 38, separated by the wall 64 in the dryer tunnel 60. To dry passenger vehicle bodies, the width, B, of the conveyor sections 32, 34 is sufficient. In some examples, where a radius r z≈3.4 m, the conveyor sections 32, 34 may have a width, B, greater than 5.0 m. These dimensions may allow drying of commercial vehicle bodies in the dryer tunnel 60.

FIG. 4 is a detailed side view of the conveyor of the example coating facility of FIGS. 1 and 3 with the conveyor sections 32, 34. Similar to the rotary table, the dryer tunnel 60 has a base 98 that is thermally insulated. The electric drives 90, 92 of the transport rolls for the roll conveyors 82, 84 are positioned outside the dryer tunnel 60. The drives 90, 92 are received on a rotary holding arrangement 100, which is positioned beneath the base 98 of the dryer tunnel 60. The transmission for the coupling of the electric drives 90, 92 to the transport rolls 86, 88 of the roll conveyors 82, 84 contains an endless chain 102 as a transmission element. The chain 102 is positioned in a thermally insulated housing 104, which has an opening 106 that communicates with the interior 108 of the dryer tunnel 60.

Alternatively, to drive the transport rolls 86, 88, the electric drives 90, 92, may also be coupled to the transport rolls 86, 88 by a transmission that, instead of the endless chain 102, contains an endless belt, a toothed belt, an endless steel cable, a cardan shaft or a vertical shaft.

To move the rotary table 80, the rotary device 78 has an electric drive 110, which is rotationally coupled by an endless chain 112 to the holding arrangement 100. The rotary table 80 is moved in a substantially oscillating manner by the electric drive 110 in a direction generally indicated by a double arrow 114 shown in FIG. 2 between a 0° and 180° pivot position to transfer the skids 14 supplied in the direction of movement 54 from the conveyor section 34 to the direction of movement 58. This movement of the rotary table 80 allows the electric drives 90, 92 for the transport rolls 86, 88 to be operated without complex execution of rotation for the electrical power supply.

FIGS. 5a and 5b illustrate another example facility 400 for drying relatively large products (e.g., motor vehicle bodies) with a conveyor in a hot-gas atmosphere region. FIG. 5a is a plan view of an example facility for drying motor vehicle bodies with a conveyor in a hot-gas atmosphere region. FIG. 5b illustrates a portion of a longitudinal section of the example facility for drying motor vehicle bodies of FIG. 5a. With the conveyor, products received on a skid may be moved through the facility 400 on a conveyor segment 416 in a direction generally indicated by arrows 402. The facility 400 has a drying section 401 with a dryer tunnel 418 extending from a first hot-gas region 414 to a second hot-gas region 420. The conveyor segment 416 comprises a conveyor or transfer section 417 with a skid conveyor arrangement 425 positioned in the dryer tunnel 418. In the conveyor section 417, skids with motor vehicle bodies are rotated on a rotary table 450 about an axis of rotation 448. The rotary table 450 is positioned in a hot region of the dryer tunnel 418 where the temperature is increased by 20° C. to 200° C. relative to the surrounding environment.

The example facility 400 contains two hoisting devices 404, 406, each of which serve as a mechanism for lifting and lowering. The first hoisting device 404 lifts a product that is moved onto the conveyor, received on a skid and coming from an inlet section 408 approximately 3 m to 4 m to a discharge arrangement 412. The discharge arrangement 412 is positioned above the inlet section 408 and adjoined by the hot-gas region 414. A motor vehicle body received on a skid coming from the hot-gas region 420 is moved by the hoisting device 406 from a discharge arrangement 422 adjoining the hot-gas region 420 to an outlet region 424. Further aspects of the aforementioned components of the facility 400 correspond to the components of the previously described facilities as described in connection with FIGS. 1 to 4, and, therefore, reference is made to the previous examples with regard to additional details and vice-versa.

The rotary table 450 in the conveyor section 417 has a drive 452 positioned below the base of the dryer tunnel 418. The drive 452 is, therefore, positioned outside the hot-gas regions 414, 420 and in a space below a thermally insulated rotary table in the region of the transfer section. The drive is, thus, substantially well protected against heat, which tends to rise.

FIG. 6 illustrates an example drying section 502 of an example coating facility 501 with an air lock 557 acting as an input lock, and an air lock 555, which is an output lock. The air locks 555, 557 contain nozzles for producing a fluid flow curtain. These locks have a structure that is described in German Patent DE 10 2009 021 004 A1, in particular, a structure that is explained with reference to FIG. 4 and in paragraphs [0067], [0068] and [0069]. The air locks 555 may also have the structure described in German Patent Application no. 10 2010 043 087.0 filed with the German Patent and Trademark Office on Oct. 28, 2010. The foregoing German Patent and German Patent Application are incorporated hereby fully by reference in their entireties.

The coating facility 501 comprises a conveyor with a conveyor segment 516. The conveyor skids 514 carrying motor vehicle bodies 512, which first move in a direction of movement 546 into an entry region 516, are moved on the conveyor segment 516 through the coating facility 501. The conveyor contains a conveyor section 504. The skids 514 are moved through the air lock 557 into the drying section 554 via the conveyor section 504. The drying section 554 has a transfer section 536 with a conveyor arrangement containing a rotary table 580. The conveyor arrangement replaces the turning loop conventionally found in dryer tunnels with a chain conveyor for skids carrying motor vehicle bodies 512. In a production area, a turning loop has significantly larger spatial requirements than a rotary table. In some examples, the embodiment of all key components of the previous exemplary embodiments, to which reference may therefore be made fully, is the same.

Figure 7:
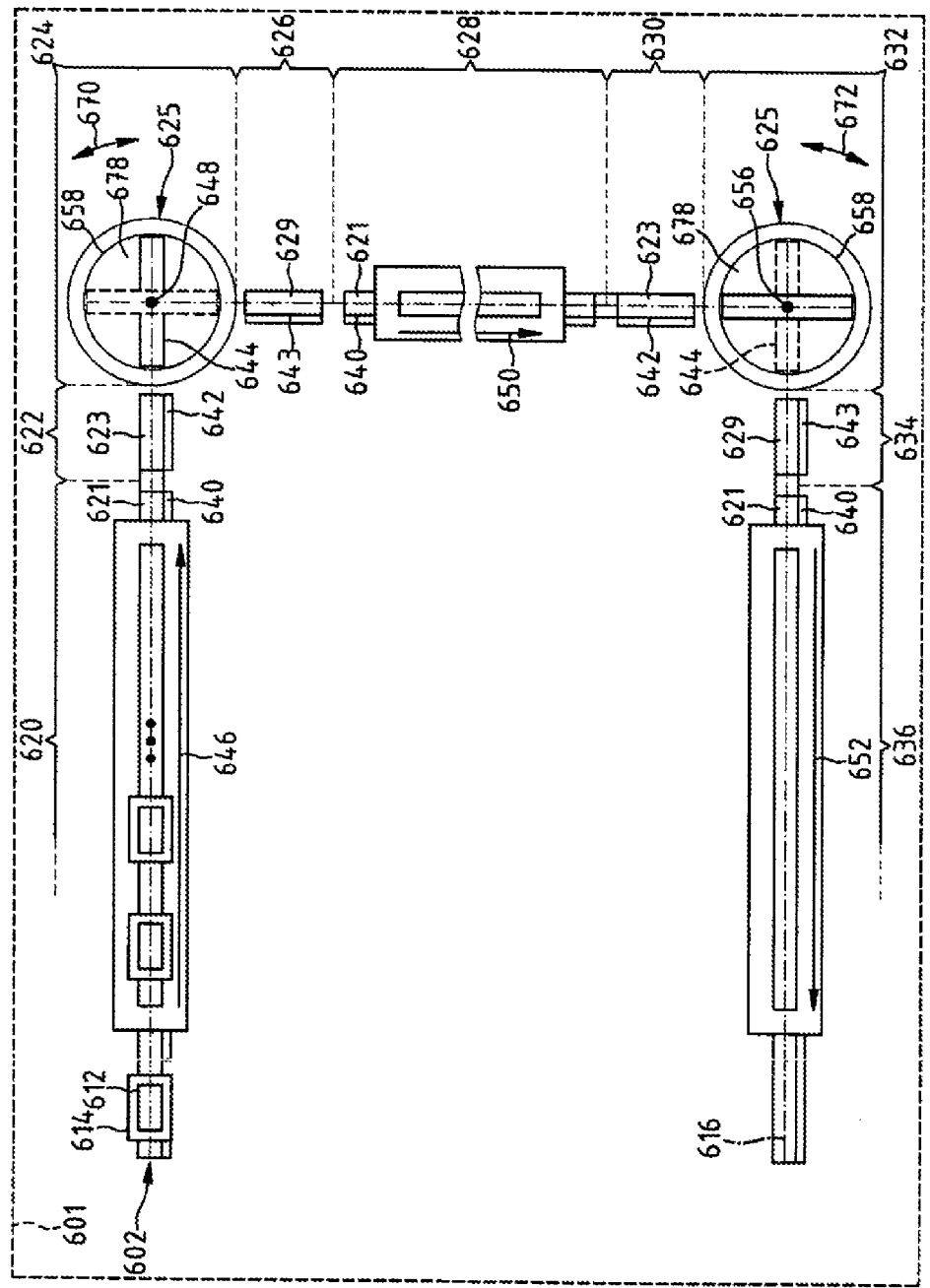
FIG. 7 illustrates another example drying section in another coating facility.

FIG. 7 illustrates another example drying section in another coating facility 601. The coating facility 601 has a conveyor 602 for transporting motor vehicle bodies 612 on skids 614 moving along a conveyor segment 616, which is guided in a substantially U-shaped path. The conveyor segment 616 has conveyor sections 620, 622, 624, 626, 628, 630, 632, 634, 636 arranged in order.

The conveyor segment 616 contains conveyor sections 620, 628, 636, in which the skids 614 are moved at a substantially constant speed. In the conveyor sections 622, 630, the skids 614 are accelerated from a transport speed, $v_{T1}$, to a speed, $v_{T2}$, which is greater than $v_{T1}$. In additional conveyor sections 626, 634, the skids 614 are decelerated from a transport speed, $v_{T3}$, to a speed, $v_{T4}$, which is less than $v_{T3}$. The conveyor segment 616 also has conveyor sections 624, 632, which are transfer sections, in which the skids 614 are rotated about axes of rotation 648, 656.

In this example, each of the conveyor sections 620, 622, 624, 626, 628, 630, 632, 634, 636 have a skid conveyor arrangement 621, 623, 625, 629 with a drive system 640, 642, 643, 644.

The structure of the skid conveyor arrangements 621, 623, 629 corresponds to the structure of the skid conveyor arrangements 21, 23 and 29 of the conveyor 2 described in connection with FIG. 1. Reference may therefore be made to the examples shown and described in connection with FIG. 1 for further details and vice-versa.

The conveyor sections 624, 632 act as redirection sections. The skid conveyor arrangement 625 contains a rotary device 658. The skid 614 may be rotated by the rotary device 658 about the axes of rotation 648, 656 approximately 90° in a direction generally indicated by double arrows 670, 672 between a position for receiving skids, which is indicated in FIG. 6 by a solid line, and a position for receiving skids 614, which is indicated in FIG. 6 as a dashed line. The skids 614 in the conveyor 602 are supplied to the transfer section 624 in the direction of movement 646. The motor vehicle bodies 612 are rotated by the rotary device 658 in the transfer section 624 about the axis of rotation 648 and, after being rotated, are removed in a direction of movement 650. The skids 614 are accordingly supplied in the direction of movement 650 to the transfer section 632 in the conveyor 602. The motor vehicle bodies 612 are rotated by the rotary device 658 in the transfer section 624 about the axis of rotation 656 and, after being rotated, are removed in a direction of movement 652. In the conveyor 602, the skid conveyor arrangement 623 acts as a supply unit for the transfer section 624, in which skids 614 with motor vehicle bodies 612 are accelerated. The skid conveyor arrangement 629 is a handover unit, to which the skids 614 with the motor vehicle bodies 612 are supplied from the transfer section 624.

In one preferred example, a conveyor 2 for transporting objects (e.g., goods or workpieces), for example, motor vehicle bodies 12, has a conveyor segment 16 on which the objects 12 may be displaced by a fixedly positioned drive system 40, 42, changing the direction of movement 46, 50, 54, 58. The conveyor segment 16 has at least one transfer section 24, 30, 36, to which the objects 12 are supplied in a first direction of movement 48, 52, 56, in which the objects 12 are rotated or pivoted about an axis of rotation 48, 52, 56, and from which the objects 12 are removed in a second direction of movement 50, 54, 58 different from the first direction of movement 46, 50, 54.

The examples described herein relate to a conveyor to transport objects (e.g., goods, workpieces, motor vehicle bodies) arranged in order. The conveyor has a conveyor segment on which the objects may be moved and the direction of movement of the objects may be changed. Some examples relate to a facility for treating the surface of workpieces, in particular, drying workpieces (e.g., motor vehicle bodies) by the example conveyors described herein.

The examples described herein provide a conveyor with which objects that are arranged in order on a conveyor segment may be transported at high throughput through a facility and within a confined space (e.g., area).

The examples described herein describe a conveyor segment which contains at least one transfer section, to which the objects are supplied in a first direction of movement, in which the objects are rotated about a fixed axis of rotation, and from which the objects are removed in a second direction of movement different from the first direction of movement.

In one example, the conveyor preferably has a conveyor segment with a transfer section upstream of an acceleration section and another transfer section downstream of a braking section.

In the acceleration section, the objects are accelerated by a supply unit from a first transport speed, $v_{T1}$, to a second transport speed, $v_{T2}$, which is greater than the first transport speed, $v_{T1}$. The accelerated objects are supplied in the first direction of movement to the transfer section from the acceleration section. The objects are rotated in the transfer section about the axis of rotation and then handed over to the braking section in a second direction of movement different from the first direction of movement. The objects handed over to the braking section are decelerated by a handover unit from a third transport speed, $v_{T3}$, to a fourth transfer speed, $v_{T4}$, which is lower than the third transport speed, $v_{T3}$. In one example, preferably $v_{T1}$ and $v_{T4}$ are substantially equal. In some examples, the difference between $v_{T1}$ and $v_{T2}$ and the difference between $v_{T3}$ and $v_{T4}$ may be substantially equal.

The acceleration of the objects before a transfer and the deceleration of the objects after the transfer allows the direction of movement of the objects to be changed within a relatively short period of time and within a relatively confined space. In this example, the period of time available for the transfer of the objects is determined, in particular, by the extent of the acceleration(s) and the length of the acceleration section and/or, in some cases, the length of the braking section.

The conveyor preferably contains transport sections, in which the workpiece carriers or the production objects are moved at a substantially constant speed. The process times for the treatment of workpiece surfaces in coating facilities may, thus, be maintained accurately with relatively minimal effort.

In accordance with the teachings of this disclosure, the transport section is positioned upstream of the acceleration section or downstream of the braking section.

In some examples, the objects in the acceleration section are subjected to an accelerating force that changes (i.e., varies) as the objects are displaced within the acceleration section (i.e., the acceleration of the objects may gradually increase and then decrease again as the objects progressively move through the acceleration section). Likewise, additionally or alternatively, the objects in the braking section may be decelerated at a changing rate of deceleration.

In some examples, workpiece carriers or production objects may, in particular, be conveyed by two lines positioned substantially parallel while the production objects are subject to a rearrangement process. In accordance with the teachings of this disclosure, such a reconfiguration process may be related to a coating of a production object (e.g., with paint), an irradiation process, a heating or cooling process, a plastic process, and/or machining deformation.

To transmit movement forces to workpiece carriers or production objects, drive units (e.g., linear) are provided and comprise tension driven elements such as chains or cables, which are mechanically coupled to workpiece carriers or production objects and, thus, also move in translation along a specific path segment with the workpiece carriers or production objects. Alternatively, fixedly mounted rolls are provided and impart a driving torque to the workpiece carriers or production objects via a rolling movement.

The conveyor, in accordance with the teachings of this disclosure, may additionally also comprise a plurality of additional conveyor sections (e.g., discharge units), over which the workpiece carriers or production objects are accelerated or decelerated. In particular, these conveyor sections are used as decoupling members between at least one first conveyor section and at least one third conveyor section.

These additional conveyor sections may be divided into a group of accelerating discharge units and/or into a group of braking discharge units, wherein the accelerating discharge units each have at least one accelerating linear drive arrangement, and wherein the braking discharge units each contain at least one braking arrangement. The braking arrangement may be configured as a linear drive arrangement or may be integrated into a linear drive arrangement.

In accordance with the teachings of this disclosure, the conveyor has a transfer section such that a workpiece positioned in the transfer section or a corresponding workpiece mount may be rotated or pivoted about a vertical axis to a wide-ranging angle, $\alpha$ ($0°<\alpha<360°$). This flexibility allows displacement of a workpiece carrier or production object over a circular path about a vertical axis.

In one example, in the transfer section, there is preferably a conveyor configured as a linear movement arrangement. Here, the accelerating discharge units each move one or more workpiece carriers or production objects at a speed greater relative to the transport speed of a first conveyor section in order to achieve, for a single or plurality of workpiece carriers or production objects, a spatial and temporal "head start" over subsequent workpiece carriers or production objects.

The aforementioned "head start" is determined in accordance with the examples described herein such that a workpiece in the transfer section may be rotated or pivoted as desired during this time. The workpiece carriers or production objects accelerated in this manner are initially received largely by the transfer section from the third linear movement arrangement and decelerated at the transfer section to a speed that is less than the transport speed of the first conveyor section. In one example, preferably the workpiece carriers or the production objects are stopped temporarily in a resting position relative to the transfer section. In one example, once the rotational/pivoting movement of the transfer section is substantially concluded, workpiece carriers or production objects are accelerated with the aid of the third linear movement arrangement to a speed that is preferably greater than the transport speed of the first conveyor section, and handed over to a braking discharge unit.

In accordance with the teachings of this disclosure, the first, second and third linear movement arrangements are each configured as roll conveyors, rack-and-pinion conveyors that may be controlled independently of one another, cable conveyors, belt conveyors or chain conveyors. In one example, the first linear movement arrangement is preferably configured as a chain conveyor, whereas the second linear movement arrangement and the third linear movement arrangement are configured as roll conveyors, each preferably having a plurality of rolls moved via a common drive and mounted rotatably about a horizontal axis.

A conveyor according to the teachings of this disclosure may be used to move workpiece carriers or transport units (e.g., skids) that are commonly used in industrial production facilities on conventional conveyors. A conveyor, in accordance with the teachings of this disclosure, may also be configured such that practically any goods, articles, workpieces or objects may be transported thereby without being positioned at or on a transport unit.

Since the transfer section receives the objects from a supply unit (accelerating discharge unit), in which the objects have been accelerated relative to the speed of the first conveyor section, a period of time occurs in which the transfer section moves and may be prepared for a subsequent object. Continuous transportation of the objects in the first conveyor at a substantially constant speed is, thus, possible.

In one example, it is advantageous if the transfer section has a rotary device rotatable about the fixed axis of rotation and has a linear movement arrangement for pulling objects onto the rotary table in the first direction of movement and releasing objects in the second direction of movement. This configuration allows objects that are positioned in a very confined space to be transported and turned 180°. In particular, this configuration allows the direction of movement of objects moving through a facility to change without the use of chain tension arrangements. This may be advantageous, in particular, for facilities with a chemical, aggressive process atmosphere and/or in facilities in which workpieces (e.g., vehicle bodies) move through a hot-gas atmosphere. With a conveyor according to the teachings of this disclosure, workpieces may be moved specifically without incorporation of dirt particles and/or condensate into the hot-gas or process atmosphere, which may be generally unavoidable or only avoided by significant difficulty in scenarios where conveyors use a conveyor chain.

The conveyor may have a linear movement arrangement for moving objects on the rotary device, the linear movement arrangement being formed with a path of displacement positioned in a manner spatially offset in relation to the fixed axis of rotation. Alternatively, the linear movement arrangement for the movement of objects on the rotary device may have two paths of displacement positioned in a manner spatially offset in relation to one another and in relation to the fixed axis of rotation.

In one example, the drive for the linear movement arrangement is preferably positioned above or below the rotary device. This location ensures a space-saving arrangement of the drive at a substantially large distance from the conveyor segment of the conveyor. Additionally, the drive may be operated outside a hot and, in some circumstances, an aggressive process atmosphere, through which the workpieces are moved by the conveyor.

In accordance with examples described herein, the conveyor may have a conveyor segment with at least one meandering path and/or a section guided in a substantially W-shaped, L-shaped, S-shaped or a U-shaped path.

The example conveyors described herein are suitable for use in a facility for the treatment of the surfaces of workpieces, in a dryer tunnel for drying workpieces, for drying motor vehicle bodies or any other appropriate process. Some examples described herein use the conveyor to transport objects with a change in direction, in a hot-gas atmosphere region, in which the temperature increases by 20° C. to 100° C. or more relative to the surrounding environment.

Since the linear movement arrangement of the rotary device is positioned in the hot-gas atmosphere region of the dryer tunnel and the drive is positioned outside the hot-gas atmosphere region of the dryer tunnel, the drive does not have to withstand a hot-gas atmosphere.

The drive of the linear movement arrangement may be coupled by a transmission that contains a transmission element protruding from outside the hot-gas atmosphere region into the hot-gas atmosphere region. The transmission element may, for example, be a shaft, a vertical shaft or an endless chain. In this example, the transmission element has at least one section extending from outside the hot-gas atmosphere region and into the hot-gas atmosphere region, and is made of a material with a thermal conductivity lower than 10 Watts per meter-Kelvin $$\left(\frac{W}{mK}\right),$$

and, in some examples, lower than $$1\frac{W}{mK}$$

(e.g., ceramic, plastic, etc.).

A ceramic suitable for use in a facility according to the examples described herein having the stipulated low thermal conductivity may, for example, contain silicate raw materials, such as clay minerals and kaolins, and/or may be formed from oxidic raw materials, such as aluminum oxide and beryllium oxide, or from non-oxidic raw materials, such as silicon carbide, boron nitride or boron carbide.

Plastics that have favorable thermal conductivity and strength values and which are, therefore, suitable for use in a facility according to the examples described may be selected from the group of polyethylene terephthalates (PET), polyurethanes (PUR), polyamides (PA), polyimides (PI), polytetrafluoroethylenes (PTFE), epoxy resins (EP) or polymethyl methacrylates (PMMA), etc.

Thermal insulation of the transmission allows reduction of condensate deposited in the dryer tunnels.

As set forth herein, an example conveyor includes a conveyor segment on which the objects may be moved by a fixed drive system. The conveyor segment comprises a transfer section, an acceleration section, and a braking section. The acceleration section is positioned upstream of the transfer section and the braking section positioned downstream of the transfer section. The objects in the acceleration section are to be accelerated by a supply unit from a first transport speed to a higher second transport speed. The accelerated objects are to be moved into the transfer section in a first direction of movement from the acceleration section, to be rotated in the transfer section about an axis of rotation, and to be moved to the braking section in a second direction of movement different from the first direction of movement. The objects in the braking section are to be decelerated by a handover unit from a third transport speed to a lower fourth transport speed.

In some examples, the conveyor segment has a transport section upstream of the acceleration section, and the objects move in the transport section at a substantially constant transport speed.

In some examples, the conveyor segment has a transport section downstream of the braking section, and the objects move in the transport section at a substantially constant transport speed.

In some examples, the objects are accelerated in the acceleration section with a varying rate of acceleration.

In some examples, the objects are decelerated in the braking section with a varying rate of deceleration.

In some examples, the first transport speed and the fourth transport speed are substantially the same.

In some examples, the objects are decelerated in the transfer section, rotated about the axis of rotation, and then accelerated.

In some examples, the conveyor segment has conveyor sections running parallel to one another and in which the objects are displaced with opposite directions of movement, or the conveyor segment has at least one section path in a W-shape, or one section guided in a meandering path, or at least one section guided in a rectangular path or in a U-shaped path.

In some examples, the transfer section has a rotary device that is rotatable about the axis of rotation and has a linear movement arrangement for pulling objects in the first direction of movement and releasing objects in the second direction of movement.

In some examples, the linear movement arrangement moves the objects onto the rotary device in a path of displacement spatially offset from the axis of rotation.

In some examples, the linear movement arrangement moves the objects onto the rotary device having two paths of displacement running parallel to one another and spatially offset from the fixed axis of rotation.

In some examples, the linear movement arrangement has a drive positioned above or beneath the rotary device.

In some examples, the linear movement arrangement decelerates objects supplied in the first direction of movement and accelerates objects in the second direction of movement.

Another example conveyor includes a conveyor segment on which the objects may be moved by a fixed drive system. The conveyor segment comprises a transfer section, an acceleration section, and a braking section. The acceleration section is positioned upstream of the transfer section and the braking section positioned downstream of the transfer section. Objects in the acceleration section are to be accelerated by a supply unit from a first transport speed to a higher second transport speed. The accelerated objects are to be moved into the transfer section in a first direction of movement from the acceleration section, to be rotated in the transfer section about an axis of rotation, and to be moved to the braking section in a second direction of movement different from the first direction of movement. The objects in the braking section are to be decelerated by a handover unit from a third transport speed to a lower fourth transport speed.

In some examples, the transfer section has a rotary device that is rotatable about the axis of rotation and a linear movement arrangement for pulling objects in the first direction of movement and releasing objects in the second direction of movement. One or more of the transfer section or the linear movement arrangement is located in a dryer tunnel having a hot-gas atmosphere region where the objects are dried.

In some examples, the linear movement arrangement moves the objects onto the rotary device with two paths of displacement running parallel to one another and spatially offset from the axis of rotation, and the drive of the rotary device is positioned outside the hot-gas atmosphere region of the dryer tunnel.

Another example apparatus includes a conveyor for transporting objects arranged in order, having a conveyor segment on which the objects may be moved by a fixed drive system. The conveyor segment has a transfer section, to which the objects are supplied in a first direction of movement, in which the objects are rotated about an axis of rotation, and from which the objects are removed in a second direction of movement different from the first direction of movement. The transfer section of the conveyor segment has a rotary device that is rotatable about the axis of rotation and has a linear movement arrangement for pulling objects in the first direction of movement and releasing objects in the second direction of movement. The linear movement arrangement of the rotary device is arranged in the hot-gas atmosphere region of the dryer tunnel and has a drive positioned outside the hot-gas atmosphere region of the dryer tunnel. The drive of the linear movement arrangement is coupled by a transmission that contains a transmission element protruding from outside the hot-gas atmosphere region into the hot-gas atmosphere region and consisting at least of a section extending from outside the hot-gas atmosphere region into the hot-gas atmosphere region of a material with a thermal conductivity lower than $$10 \frac{W}{mK}.$$

In some examples, the linear movement arrangement has a drive positioned above or beneath the rotary device.

In some examples, the conveyor of the example apparatus includes one of the conveyor examples described above.

In some examples, the transmission arrangement is surrounded at least partially by a thermally insulated housing.

Another example apparatus includes first and second conveyors transporting objects in order, and a rotatable transfer section to which the objects are provided from the first conveyor in a first direction. The objects are to be rotated about an axis of rotation and placed onto the second conveyor from the rotatable transfer section in a second direction different from the first direction.

In some examples, the example apparatus also includes an acceleration section positioned upstream of the transfer section and a braking section positioned downstream of the transfer section. The objects are accelerated in the acceleration section in the first direction prior to entering the transfer section and the objects are decelerated in the deceleration section in the second direction subsequent to leaving the transfer section.

In some examples, the rotatable transfer section is rotated by a rotary device positioned above or below the rotatable transfer section.

Another example conveyor 2, 652 for transporting objects arranged in order (e.g., goods, workpieces, motor vehicle bodies 12, 612) has a conveyor segment 16, 616 on which the objects 12, 612 may be moved by a fixed drive system 40, 42. The conveyor segment 16, 616 has at least one transfer section 24, 30, 36, 624, 632, to which the objects 12, 612 are supplied in a first direction of movement 48, 52, 56, 646, 650, in which the objects 12, 616 are rotated about an axis of rotation 48, 52, 56, 648, 656, and from which the objects 12, 612 are removed in a second direction of movement 50, 54, 58, 650, 652 different from the first direction of movement 46, 50, 54, 646, 650.

In some examples, the conveyor segment 16, 616 contains an acceleration section 22, 622 positioned upstream of the transfer section 24, 30, 36, 624, 632 and a braking section 26, 626 positioned downstream of the transfer section. The objects 12, 612 in the acceleration section 22, 622 are accelerated by a supply unit 23, 623 from a first transport speed, $v_{T1}$, to a higher second transport speed, $v_{T2}$. The accelerated objects 12, 612 are supplied in a first direction of movement 42, 52, 56, 646, 650 to the transfer section 24, 30 36, 624, 632 from the acceleration section 22, 622, rotated in the transfer section 24, 30, 36, 624, 632 about the axis of rotation 48, 52, 56, 648, 656, and handed over to the braking section 26, 626 in the second direction of movement 50, 54, 58, 650, 652 different from the first direction of movement 46, 50, 54, 646, 650. The objects 12, 612 are handed over to the braking section 26, 626 to be decelerated by a handover unit 29, 629 from a third transport speed, $v_{T3}$, to a lower fourth transport speed, $v_{T4}$.

In some examples, the conveyor segment 16 includes a transport section 20 positioned upstream of the acceleration section 22. The objects 12 are moved in said transport section at a substantially constant transport speed, $v_{T1}$.

In some examples, the conveyor segment 16 is formed with a transport section 27 positioned downstream of the braking section 26. The objects 12 are moved in said transport section at a substantially constant transport speed, $v_{T4}$.

In some examples, the objects 12 are accelerated in the acceleration section 22 with a varying acceleration and/or the objects 12 are decelerated in the braking section 29 with a varying deceleration.

In some examples, the first transport speed, $v_{T1}$, and the fourth transport speed, $v_{T4}$, are substantially the same.

In some examples, the objects 12 are decelerated in the transfer section 24, rotated about the axis of rotation 48, and accelerated.

In some examples, the conveyor segment 16 has conveyor sections 20, 27 running parallel to one another and in which the objects 12 are displaced with opposite directions of movement and/or the conveyor segment 16 has at least one section guided in a W-shaped path, one section guided in a meandering path, at least one section guided in a rectangular path and/or in a U-shaped path.

In some examples, the transfer section 24 has a rotary device 78 that is rotatable about the axis of rotation 48 and has a linear movement arrangement 83, 85 for pulling objects 12 in the first direction of movement 46, 50, 54 and releasing objects 12 in the second direction of movement 50, 54, 58.

In some examples, the linear movement arrangement 83, 85 moves the objects 12 onto the rotary device 78 in a path of displacement 94, 96 positioned in a manner spatially offset in relation to the fixed axis of rotation 56.

In some examples, the linear movement arrangement 83, 85 moves the objects 12 onto the rotary device 78 having two paths of displacement 94, 96 running substantially parallel to one another and positioned spatially offset in relation to the fixed axis of rotation 56.

In some examples, the linear movement arrangement 83, 85 has a drive 90, 92 positioned above or beneath the rotary device 78.

In some examples, the linear movement arrangement 83, 85 decelerates the objects 12 supplied in the first direction of movement 46, 50, 54 and accelerates the objects 12 in the second direction of movement 50, 54, 58.

Another example facility 1 for treating the surface of workpieces, (e.g., drying workpieces, motor vehicle bodies 12) has a hot-gas atmosphere region 108 and the conveyor 2 utilizing the examples described above.

In some examples, the drive 110 of the rotary device 78 is positioned outside the hot-gas atmosphere region 108 of the dryer tunnel 60.

In some examples, the linear movement arrangement 82, 84 of the rotary device 78 is positioned in the hot-gas atmosphere region 108 of the dryer tunnel 60 and has a drive 90, 92 positioned outside the hot-gas atmosphere region 108 of the dryer tunnel 60. The drive 90, 92 of the linear movement arrangement 82, 84 is coupled by a transmission that contains a transmission element 102 protruding from outside the hot-gas atmosphere region 108 and into the hot-gas atmosphere region 108. The transmission element 102 is in a section at least extending from outside the hot-gas atmosphere region 108 into the hot-gas atmosphere region 108 of a material with a thermal conductivity lower than $$10 \,\frac{W}{mK},$$

and, in some examples, lower than $$1 \,\frac{W}{mK}$$

(e.g., ceramic, plastic, etc.).

In some examples, the transmission arrangement is surrounded at least partially by a thermally insulating housing 104.

It is noted that this patent claims priority from a continuation-in-part of International Patent Application No. PCT/EP2012/062079, which was filed on Jun. 22, 2012, which claims priority to German Patent Application No. 10 2011 078 707, which was filed on Jul. 5, 2011. The foregoing International Patent Application and German Patent Application are hereby incorporated herein by reference in their entireties.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A conveyor for transporting objects arranged in order comprising:
    a conveyor segment on which objects may be moved by a fixed drive system,
    wherein the conveyor segment includes a transfer section, an acceleration section, and a braking section,
    wherein the acceleration section is positioned upstream of the transfer section and the braking section positioned downstream of the transfer section,
    wherein the objects in the acceleration section are to be accelerated by a supply unit from a first transport speed to a higher second transport speed,
    wherein the accelerated objects are to be moved into the transfer section in a first direction of movement from the acceleration section, to be rotated in the transfer section about an axis of rotation, and to be moved to the braking section in a second direction of movement different from the first direction of movement, and
    wherein the objects in the braking section are to be decelerated by a handover unit from a third transport speed to a lower fourth transport speed.

2. The conveyor as defined in claim 1, wherein the conveyor segment has a transport section upstream of the acceleration section, and wherein the objects are to be moved in the transport section at a substantially constant transport speed.

3. The conveyor as defined in claim 1, wherein the conveyor segment has a transport section downstream of the braking section, and wherein the objects are to be moved in the transport section at a substantially constant transport speed.

4. The conveyor as defined in one of claims 1, wherein the objects are to be accelerated in the acceleration section with a varying rate of acceleration.

5. The conveyor as defined in one of claims 1, wherein the objects are to be decelerated in the braking section with a varying rate of deceleration.

6. The conveyor as defined in claim 1, wherein the first transport speed and the fourth transport speed are substantially the same.

7. The conveyor as defined in claim 1, wherein the objects are to be decelerated in the transfer section, rotated about the axis of rotation, and then accelerated.

8. The conveyor as defined in claim 1, wherein the conveyor segment has conveyor sections running parallel to one another and in which the objects are to be displaced with opposite directions of movement, or the conveyor segment has at least one section path in a W-shape, one section guided in a meandering path or at least one section guided in a rectangular path or in a U shape path.

9. The apparatus as defined in claim 1:
    wherein the transfer section of the conveyor segment has a rotary device that is rotatable about the axis of rotation and has a linear movement arrangement for pulling objects in the first direction of movement and releasing objects in the second direction of movement, and
    wherein the linear movement arrangement of the rotary device is arranged in a hot-gas atmosphere region of a dryer tunnel and has a drive positioned outside the hot-gas atmosphere region of the dryer tunnel, wherein the drive of the linear movement arrangement is coupled by a transmission that contains a transmission element protruding from outside the hot-gas atmosphere region into the hot-gas atmosphere region and consisting at least of a section extending from outside the hot-gas atmosphere region into the hot-gas atmosphere region, the transmission element including material with a thermal conductivity lower than $$10 \frac{W}{mK}.$$

10. The conveyor as defined in claim 1, wherein the transfer section has a rotary device that is rotatable about the axis of rotation and has a linear movement arrangement for pulling objects in the first direction of movement and releasing objects in the second direction of movement.

11. The conveyor as defined in claim 10, wherein the linear movement arrangement moves the objects onto the rotary device in a path of displacement spatially offset from the axis of rotation.

12. The conveyor as defined in claim 10, wherein the linear movement arrangement moves the objects onto the rotary device having two paths of displacement running parallel to one another and spatially offset from the axis of rotation.

13. The conveyor as defined in claim 10, wherein the linear movement arrangement has a drive positioned above or beneath the rotary device.

14. The conveyor as defined in claim 10, wherein the linear movement arrangement decelerates objects supplied in the first direction of movement and accelerates objects in the second direction of movement.

15. An apparatus comprising:
a conveyor segment on which objects may be moved by a fixed drive system,
wherein the conveyor segment includes a transfer section, an acceleration section, and a braking section,
wherein the acceleration section is positioned upstream of the transfer section and the braking section positioned downstream of the transfer section,
wherein the objects in the acceleration section are to be accelerated by a supply unit from a first transport speed to a higher second transport speed,
wherein the accelerated objects are to be moved into the transfer section in a first direction of movement from the acceleration section, to be rotated in the transfer section about an axis of rotation, and to be moved to the braking section in a second direction of movement different from the first direction of movement, and
wherein the objects in the braking section are decelerated by a handover unit from a third transport speed to a lower fourth transport speed.

16. The apparatus as defined in claim 15, wherein the transfer section has a rotary device that is rotatable about the axis of rotation and a linear movement arrangement for pulling objects in the first direction of movement and releasing objects in the second direction of movement, wherein one or more of the transfer section or the linear movement arrangement is located in a dryer tunnel having a hot-gas atmosphere region where the objects are dried.

17. The apparatus as defined in claim 16, wherein the linear movement arrangement moves the objects onto the rotary device having two paths of displacement running parallel to one another and spatially offset from the axis of rotation, and wherein the drive of the rotary device is positioned outside the hot-gas atmosphere region of the dryer tunnel.

18. An apparatus for treating the surface of workpieces comprising:
a conveyor for transporting objects arranged in order, having a conveyor segment on which the objects may be moved by a fixed drive system, wherein the conveyor segment has a transfer section, to which the objects are supplied in a first direction of movement, in which the objects are rotated about an axis of rotation, and from which the objects are removed in a second direction of movement different from the first direction of movement,
wherein the transfer section of the conveyor segment has a rotary device that is rotatable about the axis of rotation and has a linear movement arrangement for pulling objects in the first direction of movement and releasing objects in the second direction of movement, and
wherein the linear movement arrangement of the rotary device is arranged in a hot-gas atmosphere region of a dryer tunnel and has a drive positioned outside the hot-gas atmosphere region of the dryer tunnel, wherein the drive of the linear movement arrangement is coupled by a transmission that contains a transmission element protruding from outside the hot-gas atmosphere region into the hot-gas atmosphere region and consisting at least of a section extending from outside the hot-gas atmosphere region into the hot-gas atmosphere region, the transmission element including material with a thermal conductivity lower than $$10 \frac{W}{mK}.$$

19. The apparatus as defined in claim 18, wherein the linear movement arrangement has a drive positioned above or beneath the rotary device.

20. The apparatus as defined in claim 18, wherein the conveyor includes one of the conveyors of claim 1, 2, 3, 5, 6, 7, 8, 10, 11, 12, 13 or 14.

21. The apparatus as defined in claim 18, wherein the transmission is surrounded at least partially by a thermally insulated housing.

22. An apparatus comprising:
first and second conveyors transporting objects in order;
a rotatable transfer section to which the objects are provided from the first conveyor in a first direction, the objects to be rotated about an axis of rotation and placed onto the second conveyor from the rotatable transfer section in a second direction different from the first direction; and
an acceleration section positioned upstream of the transfer section and a braking section positioned downstream of the transfer section, wherein the objects are accelerated in the acceleration section in the first direction prior to entering the transfer section and the objects are decelerated in the deceleration section in the second direction subsequent to leaving the transfer section.

23. The apparatus as defined in claim 22, wherein the rotatable transfer section is rotated by a rotary device positioned above or below the rotatable transfer section.

* * * * *

UNITED STATES PATENT AND TRADEMARK OFFICE
CERTIFICATE OF CORRECTION

PATENT NO. : 9,284,127 B2  
APPLICATION NO. : 14/140958  
DATED : March 15, 2016  
INVENTOR(S) : Klaus Heinsohn and Lutz Philipp Page 1 of 1

It is certified that error appears in the above-identified patent and that said Letters Patent is hereby corrected as shown below:

Claims

Column 18, line 43 (Claim 20) remove "or 14" after "13"

Column 18, line 43 (Claim 20) insert --or-- between "12," and "13"

Signed and Sealed this  
Seventeenth Day of May, 2016

Michelle K. Lee  
*Director of the United States Patent and Trademark Office*